June 8, 1965
G. T. CULBERTSON
3,188,522
PHASE SEQUENCE NETWORK
Filed Aug. 24, 1960
3 Sheets-Sheet 1
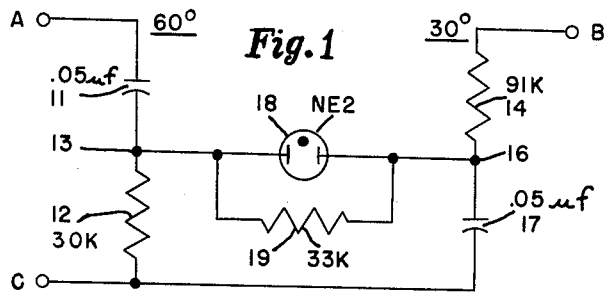
*Fig. 1*
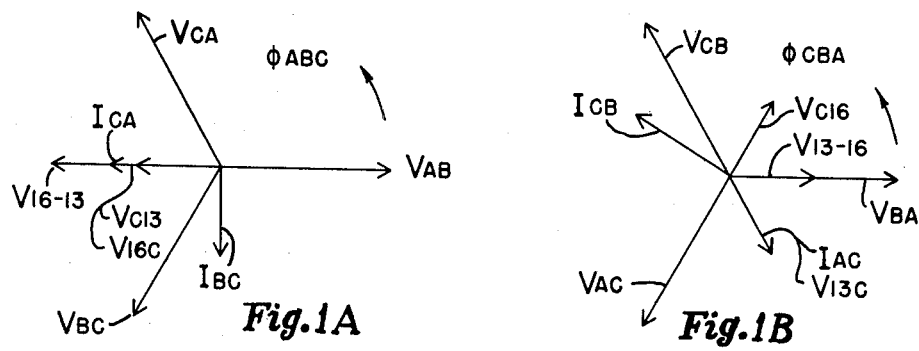
*Fig. 1A*  *Fig. 1B*
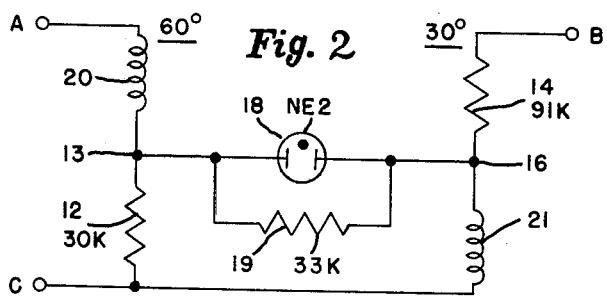
*Fig. 2*
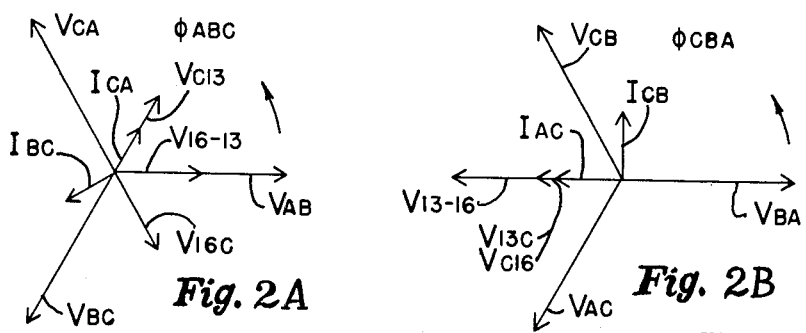
*Fig. 2A*  *Fig. 2B*
INVENTOR.
George J. Culbertson
BY
Owen & Owen INVENTOR.
George T. Culbertson
BY
Owen & Owen June 8, 1965  G. T. CULBERTSON  3,188,522
PHASE SEQUENCE NETWORK
Filed Aug. 24, 1960  3 Sheets-Sheet 3

INVENTOR.
George T. Culbertson
BY
Owen & Owen

United States Patent Office 3,188,522
Patented June 8, 1965

---

3,188,522
PHASE SEQUENCE NETWORK
George T. Culbertson, Gardena, Calif., assignor, by mesne assignments, to Master Specialties Company, Gardena, Calif., a corporation of California
Filed Aug. 24, 1960, Ser. No. 51,701
9 Claims. (Cl. 317—48)

This invention relates in general to phase sequence networks and more specifically to networks for differentiating between the respective phase sequence of polyphase line voltage sources.

In ground installations as well as in aircraft electrical system, polyphase line voltage systems are frequently used. The control circuitry for motors and the like are installed predicated upon a particular phase sequence. In the event pairs of wires are crossed providing an improper phase sequence, motors and other load devices are inoperative or are caused to function improperly. When using reversible motors, it is anticipated that actuated controls will cause an operation in a specific direction and serious mishaps may result from improper connections. Furthermore, multiphase sources may have unbalanced voltages or one of the lines may become open causing misoperation. Accordingly one of the objects of this invention is to provide a phase sequence network which will respond in a predicted manner in response to the respective phase connections.

Another object of this invention is to provide a phase sequence network capable of indicating the proper phase connections.

A further object of this invention is to provide a relay or solenoid whose operation is dependent upon a predetermined phase sequence.

Yet another object of this invention is to provide a phase sequence network designed to operate from a balanced source and which avoids limitations of prior art devices by having a fail-safe characteristic. The network according to the present invention is adapted to function properly only when substantially balanced polyphase voltages are present on the respective lines. In the event one of the lines becomes open, to misoperation will result as may happen in device according to teachings of the prior art.

Basically, the present invention accomplishes the above objects in a manner to be particularly described in connection with a three-phase system although it will become clear how it may be extended to other multiphase circuits. The invention includes a phase shift network in the two paths between a common line and each of the two remaining lines. Each network has an intermediate junction point with an indicating device joining the two junction points to provide an indicaton when the phases are energzed in proper sequence.

A better understanding of the invention itself may be had when reference is made to the following description taken in connection with the accompanying drawings, in which:

FIG. 1 represents a schematic circuit diagram illustrating one form of the invention;

FIG. 1A is a vector representation of one phase sequence for the FIG. 1 diagram;

FIG. 1B is a vector representation of the other phase sequence for the FIG. 1 diagram;

FIG. 2 is a schematic circuit diagram showing another form of reactive element;

FIG. 2A is a vector representation of one phase sequence for the FIG. 2 circuit;

FIG. 2B is a vector representation of another phase sequence for the FIG. 2 circuit;

Figure 3:
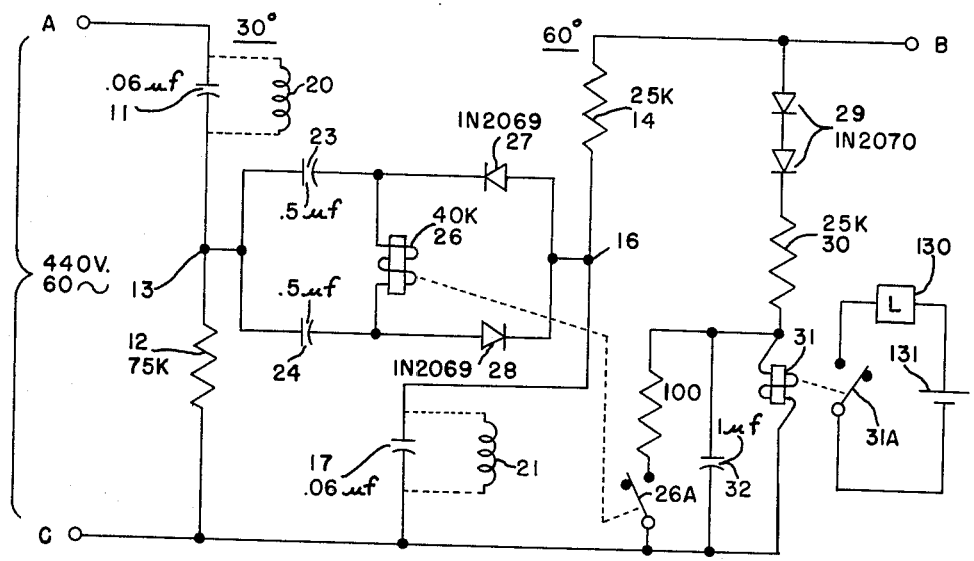
FIG. 3 is a schematic circuit showing of another form of the invention illustrating both types of reactive elements.

The invention may readily be understood by referring to the circuit shown in FIG. 1 which depicts three lines A, B and C of a three-phase power supply. The connection at the indicator network includes a phase shift network from line A to line C indicated as shifting the current with respect to the voltage by 60 degrees. It includes a capacitor 11 connected to resistor 12 through junction 13. The line B has a second phase shift network connected between it and line C and includes resistor 14, junction 16 and capacitor 17. This second network shifts the phase by 30 degrees. Independent of the aforementioned shifting networks is a gaseous indicator 18 with shunting resistor 19 between junction points 13 and 16.

In order to understand the operation of the gaseous indicator 18, which may be a neon tube, it must be appreciated that three-phase circuits may have either a sequence ABC or CBA. The former, for example, includes the respective alternating currents where phase AB may be considered a reference with phase BC reaching a maximum a third of a cycle later, followed by phase CA a third of a cycle later, etc. When considering the sequence CBA, CB may be taken as a reference with BA and then AC each following by respective periods of a third of a cycle.

FIG. 1A represents a vector diagram of sequence ABC taken at an instant of time and without considering the dynamic effect of indicator 18 with its shunt 19. If the lines are balanced the three voltage vectors V(AB), V(BC) and V(CA) are seen to be of equal magnitude and following in a counterclockwise manner by respective periods of one-third cycle or 120 degrees. The capacitor is known to have a characteristic such that the current through it leads the voltage by 90 degrees whereas the current and voltage in a resistive circuit are in phase with one another. By a judicious choice of resistance and capacitance values, the total impedance phase angle of leg CA should be arranged at 60 degrees considering the frequency of the line voltage. The current vector CA is plotted 60 degrees in advance of V(CA) and the voltage across resistor 12 is found to be in phase as V(C13) having a magnitude of $V(CA)/2$.

Looking now at leg BC which has a phase angle of 30 degrees, the current vector I(BC) is plotted as leading V(BC). Since the voltage across capacitor 17 must lag its current by 90 degrees, the voltage vector V(16C) is superimposed upon vector V(C13). A resultant voltage V(16–13) which is available for the indicator lamp 18 with its shunt 19 is plotted and has a magnitude of any of the line votages, such as V(CA) or V(BC). The resultant voltage is arrived at by summing the vectors V(16C) and V(C13). The value of resistor 19 is selected so as to allow neon lamp 18 to fire with this sequence of ABC but to remain extinguished under phase CBA conditions.

FIG. 1B shows the vector diagram for the FIG. 1 circuit when the lines are connected in improper phase sequence CBA. The current I(AC) is plotted as leading V(AC) by 60 degrees and since the voltage across resistor 12 is in phase with its current, V(13C) of magnitude $V(AC)/2$ is plotted. The current vector I(CB) is likewise leading V(CB) by 30 degrees and has a voltage vector across capacitor 17 which lags the current by 90 degrees. The resultant voltage available across the lamp 18 is V(13–16) which is seen to have an absolute magnitude of one-half the line voltage. Considering both phase sequences now, it is recalled that in the proper order the voltage across lamp 18 is equal to the line voltage whereas with the improper order, just one-half of the line voltage is present. The lamp 18 and resistor 19 are selected with characteristics which cause a firing in one sequence but which remain extinguished in the opposite order for the particular line voltage and frequency.

In the event any of the lines A, B or C are open, it will be seen that there is insufficient voltage available to fire lamp 18. For example, if line B is open, V(16–13) is seen to be less than half of V(CA) because of the relatively high impedance of capacitor 11. Similarly if line C is open or line A is open, V(16–13) is less than half of the line voltage and is insufficient to fire the lamp. Accordingly, it is seen that the present invention provides a fail-safe device.

Reference is now had to FIG. 2 which illustrates another embodiment of the invention in which the capacitors 11 and 17 of FIG. 1 are replaced by inductors 20 and 21 respectively. It is understood that the current through an inductive reactance lags the voltage by approximately 90 degrees allowing for a fail-safe indication of one phase sequence only. The vector diagram of FIG. 2A shows the non-firing improper phase sequence ABC with the three line-voltage vectors as in FIG. 1A. The current through path CA lags its voltage by 60 degrees resulting in a voltage across resistor 12 in phase V(C13). The impedance of leg BC is chosen to give a 30 degree phase shift and since the voltage across inductor 21 leads by 90 degrees, it results in vector V(16C). The resultant voltage from junction points 16 to 13 is drawn as vector V(16–13) and has a magnitude of one-half of the line voltage. Just as with the circuit of FIG. 1, the network comprising lamp 18 and resistor 19 is selected to have a characteristic which prevents firing of the lamp by the voltage level available with the improper phase sequence. When the correct sequence of CBA exists, an adequate voltage is available to fire the lamp as may be seen by reference to FIG. 2B. The voltage across resistor 12 being in phase with the 60 degree lagging current is represented as V(13C) while the voltage across inductor 21 which leads its current 90 degrees is shown as V(C16). The magnitude of the resultant lamp voltage V(13–16) is shown as being equal to each of the line voltage vectors. Just as in the circuit of FIG. 1, it is seen that the opening of any of the lines A, B or C will result in a voltage across the lamp 18 which is less than half of the line voltage and thus insufficient to ignite the lamp.

The embodiment of FIG. 3 utilizes the same form of phase shift network between terminals AC and BC except that the relative values of resistors 12, 14 and capacitors 11, 17 are chosen to have a 30 degree phase shift in line AC and a 60 degree phase shift in line BC. The modification utilizing inductors 20, 21 in place of capacitors 11, 17 is illustrated in dotted form and is chosen to have the phase shifts of 30 degrees and 60 degrees respectively as indicated in FIG. 3. In this embodiment, the neon indicator between junctions 13 and 16 is replaced by a relay network 22 which includes two capacitors 23, 24 joined at one end to junction 13 with their oppsite ends connected across relay coil 26. Additionally, two rectifier devices, which preferably are semi-conductors, are oppositely poled with one terminal joined at junction 16 and their opposite terminals connected across the relay coil 26. The phase sequence relay circuit has an additional path from line B to line C through rectifiers 29 which when placed in series have sufficient back voltage characteristics. The series path also includes resistor 30 and output relay winding 31, which controls an output circuit exemplified by load 130 and power source 131, through conventional contacts 31A. The relay 31 is shunted by a smoothing capacitor 32. Excessive current through contacts 26A is prevented by resistor 33 connected in series with the contacts across coil 31.

In operation of the circuit of FIG. 3, only under the conditions of balanced voltages applied to lines A, B and C having the proper phase sequence will there be an insufficient voltage across relay coil 26 to energize that relay. Under these proper conditions, the contacts 26A will remain open allowing relay 31 to energize and provide an output indication or circuit control through contacts 31A. It is understood that contacts 31A may be included in motor control circuits as is common in the art. The voltage across lines B and C is rectified by diodes 29 and smoothed by capacitor 32 to operate direct current relay 31 when the contacts 26A are open. Resistor 30 is a voltage dropping resistor to provide an appropriate voltage to the output relay 31. It may be recognized that the contacts 26A could be normally closed and in series with relay 31 to arrive at the same operation although the illustrated form is preferable in view of the normal current which does not have to flow through the reed relay contacts.

The relay network 22 is seen to have oppositely poled diodes 27 and 28 which act as full wave rectifiers for the applied voltage which is then filtered through capacitors 23 and 24. The capacitors are connected across relay winding 26 as a voltage doubler for increased sensitivity. When the proper sequence of balanced voltages is applied to lines A, B and C, no voltage is available across terminals 13 to 16 resulting in relay 26 remaining de-energized with its contacts 26A open allowing the output circuit to operate due to energization of relay 31. However, if unbalanced voltages are applied, or if a ground occurs in one line, or if the improper sequence is on the line, then sufficient voltage is available across terminals 13 to 16 to energize relay 26 causing relay 31 to drop out.

Figure 3A:
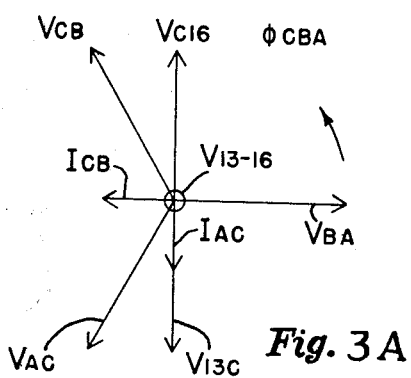
FIG. 3A is a vector diagram of one phase sequence for the circuit of FIGS. 3 and 4 with one form of reactive element.
Figure 3B:
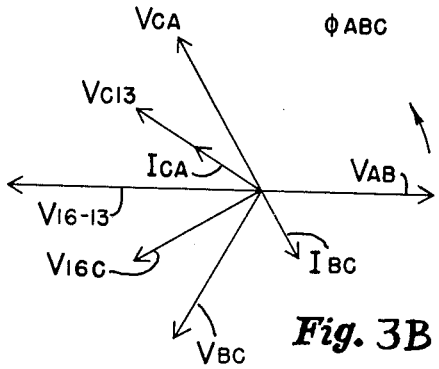
FIG. 3B is a vector diagram for the other phase sequence of the circuit shown in FIGS. 3 and 4.

Reference is had to FIGS. 3A and 3B for the vector presentation of the circuit of FIG. 3 with capacitors 11 and 17 for a more complete understanding. The vectors of FIG. 3A represent the proper phase sequence CBA for the capacitor shift network with path AC having a 30 degree shift in phase whereas path CB has a 60 degree phase shift. It may be seen that under this operation, V(13–16) has a zero volt magnitude resulting in operation of relay 31. When the phase is incorrect, V(16–13) of FIG. 3B is seen to have a magnitude which operates relay 26 and de-energizes output relay 31. Relay 26 has a sensitivity such that it operates with an opening or grounding of any of the lines as well as a reverse phase sequence.

Figure 3C:
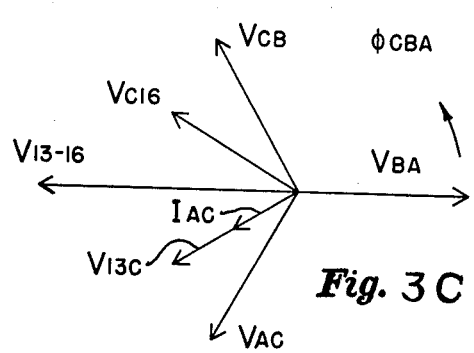
FIG. 3C is a vector diagram of one phase sequence for the circuits shown in FIGS. 3 and 4 with an inductive reactive element.
Figure 3D:
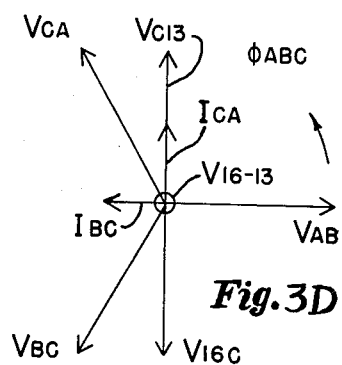
FIG. 3D is a vector diagram for the other phase sequence of the circuits shown in FIGS 3 and 4 with an inductive reactive element.

FIGS. 3C and 3D represent the vector condition of FIG. 3 with the inductors 20 and 21 used in place of capacitors 11 and 17. In this circuit path AC provides a 30 degree phase shift while path CB has a 60 degree phase shift. Under a connection of the lines to give CBA phase operation, V(13–16) has a magnitude sufficient to operate relay 26 and de-energize the output relay 31. Under the proper phase connections ABC of FIG. 3D, V(13–16) has a zero voltage so that relay 31 will operate.

Figure 4:
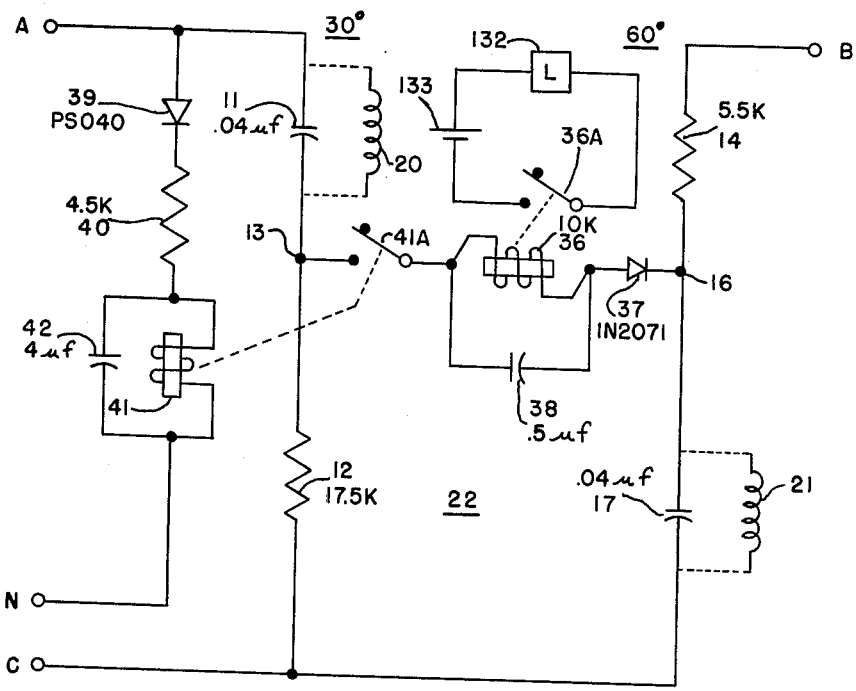
FIG. 4 is a schematic circuit diagram of another embodiment of the invention illustrating both types of reactance.

The circuit of FIG. 4 includes the same phase shift paths AC and BC as shown in FIG. 3 and the operation may be understood by reference to the vector diagram of FIGS. 3A and 3B for the capacitor embodiment and FIGS. 3C and 3D for the inductor embodiment. The relay network 22 includes a diode 37 of the semiconductor type in series with output relay 36 shunted by smoothing capacitor 38. The contacts 36A open an output energization circuit indicated as including a load 132 and a power source 133 when relay 36 is de-energized. The circuit is controlled by contacts 41A of a sensing relay 41. Relay 41 appears in path AN shunted by smoothing capacitor 42 and in series with dropping resistor 40 and diode 39. Path AN connects from line A to neutral or ground line N. Should line A become open, contacts 41A open and prevent operation of the output circuit through contacts 36A. Diodes 39 and 37 provide a rectified direct current potential for operation of the respective relays 41 and 36.

In the FIG. 4 circuit with capacitors 11 and 17, FIG. 3B shows the proper phase sequence ABC with the vector V(16–13) of a magnitude sufficient to energize the output circuit through contacts 36A. On the other hand, FIG. 3A shows that with improper sequence CBA, there is no voltage across relay 36 indicating the improper phase through open contacts 36A. During normal operation relay 41 is included in an operation circuit to indicate a voltage on line A. If this relay were not present in the circuit when line A opens, a resistive path would exist through line B, resistor 14, diode 37, winding 36 and resistor 12 to line C. The conduction on alternate half cycles would enable the relay to operate giving a false indication that the proper three phase voltages are present. No additional relay is needed to protect against a false indication when lines B or C open. If line B opens, capacitor 17 ultimately becomes charged through diode 37 and allows relay 36 to drop out. During a normal operation, the discharge path for capacitor 17 is through closed line B. If line C opens, capacitor 11 becomes charged through diode 37 and allows relay 36 to drop out. The capacitors cannot discharge when the respective lines B or C are open in view of the high back impedance of the diode. When inductors 20 and 21 shown in dotted lines are inserted in place of capacitors 11 and 17, the circuit senses the proper phase sequence CBA of FIG. 3C and the incorrect sequence of FIG. 3D. In FIG. 3C voltage V(13–16) is adequate to energize relay 36 whereas in FIG. 3D the voltage V(16–13) has a zero amplitude and relay 36 does not pull in. To effectively provide a fail-safe feature in this embodiment, it would be necessary to include two additional paths similar to path AN from lines B to N and C to N. The respective sensing relays would each have their contacts in relay circuit 22 just as shown with respect to contacts 41A.

It is understood that in each of the embodiments illustrated and described, various modifications may be made without departing from the spirit and scope of the intended coverage. The phase shift networks are preferably of 30 degrees and 60 degrees, although slight departures may exist as long as the sensitivities of the relay energizations and gas tube ignitions are within the limitations described providing a fail-safe indication of the proper phase sequence. It is understood that the phase shift capacitors and inductors may vary slightly from being perfect reactive units having 90 degree shifts without affecting the proposed operation. Further, in utilizing this inventive approach for multiphase circuits greater than the three phase operation described, three wires at a time may be selected until the entire phase sequence is determined. Standard resistor and reactor sizes may be selected to approximate the described phase shifts.

As an example of acceptable values, for a line voltage of from 215 to 265 volts at 54 to 66 cycles per second frequency, FIG. 1 may utilize capacitors 11 and 17 at 0.04 microfarad each and resistors 12 and 14 at 39K and 120K ohms respectively. At a line voltage of 430 to 530 volts and 54 to 66 cycles, capacitors 11 and 17 may be 0.01 microfarad each and resistors 12 and 14 may be 160K and 470K ohms respectively. Further, at 105 and 135 volts and 54 to 66 cycles, capacitors 11 and 17 may be 0.08 microfarad each and resistors 12 and 14 may be 20K and 56K ohms respectively. Resistor 19 may be 33K ohms.

For a definition of the invention, reference is made to the appended claims.

What is claimed is:

1. A phase sequence network of the class described including a first, second and third terminal for receiving three phases of line voltage at a predetermined frequency, a first series circuit extending from said second to said first terminal including a reactive element, a first junction point and a resistive element respectively, a second series circuit extending from said third to said first terminal including a resistive element, a second junction point and a reactive element respectively, said first and second circuits having a phase shift angle of substantially 30 degrees and 60 degrees respectively, a first relay winding connected between said first and second junction points for indicating the line phase sequence in response to the voltage magnitudes across said junction points, and semiconductor means connected to said first relay winding between said junction points whereby said relay winding may be prevented from giving a false indication of the line phase sequence in response to at least one of said line voltage source lines becoming open.

2. A phase sequence network as defined in claim 1 wherein a second sensing relay winding is connected to one of said line terminals and contact means of said second relay control the energization current of said first relay to indicate a proper phase sequence only when both of said relays are energized in response to a predetermined phase sequence being applied to said three terminals.

3. A phase sequence network as defined in claim 2 wherein said second sensing relay provides a fail-safe indicating feature to protect against the opening of the line terminal to which said second sensing relay winding is connected.

4. A phase sequence network as defined in claim 3 wherein said reactive element of both said first and second series circuits comprises a capacitor and wherein said first relay includes output contacts for controlling an output load circuit.

5. A phase sequence network as defined in claim 1 including capacitor means connected across said first relay winding between said junction points.

6. A phase sequence network as defined in claim 1 including a second relay winding connected to at least one of said terminals through a rectifying diode and contact means controlled by one of said relay windings for controlling the energization of said other of said relay windings.

7. A phase sequence network as defined in claim 6 including a load circuit controlled by the simultaneous energization of both of said relay windings which will not occur if one of said terminals is open or if the line phase sequence is reversed.

8. A phase sequence network comprising first, second and third terminals for receiving three phases of line voltage at a predetermined frequency, a first series circuit extending from said second to said first terminal including a reactive element, a first junction point and a resistive element respectively, a second series circuit extending from said third to said first terminal including a resistive element, a second junction point and a reactive element respectively, said first and second circuits having a phase shift angle of substantially 30° and 60° respectively, and a relay winding connected intermediate two parallel lines, between said first and second junction points, said parallel lines including a capacitor and an oppositely poled rectifier whereby said relay winding is deactivated only when a predetermined phase sequence is applied to said three terminals.

9. The phase sequence device of claim 8 wherein a second output relay winding is connected to one of said line terminals and the contacts of said first relay are operably connected to said second relay whereby said second relay is de-energized by said first relay when said predetermined phase sequence is absent from said three terminals.

References Cited by the Examiner

UNITED STATES PATENTS

| | | | |
|---|---|---|---|
| 2,402,573 | 6/46 | Pell | 317—48 X |
| 2,654,044 | 9/53 | Hough | 323—28 X |
| 2,691,158 | 10/54 | Wittenberg | 324—133 |
| 2,816,265 | 12/57 | Chamberlain | 317—47 X |
| 2,836,771 | 5/58 | Jessee | 317—47 |
| 2,975,334 | 3/61 | Callan | 317—48 |

SAMUEL BERNSTEIN, *Primary Examiner.*